(12) United States Patent
Rittman et al.

(10) Patent No.: US 9,482,275 B2
(45) Date of Patent: Nov. 1, 2016

(54) STRUCTURED SLIDING SURFACE OF A BEARING SHELL

(75) Inventors: Stefan Rittman, Kirchheimbolanden (DE); Ralf Rossmanith, Oestrich-Winkel (DE); Steven Doyle, Blacksburg, VA (US)

(73) Assignee: Federal Mogul Wiesbaden GmbH, Wiesbaden (DE)

( * ) Notice: Subject to any disclaimer, the term of this patent is extended or adjusted under 35 U.S.C. 154(b) by 648 days.

(21) Appl. No.: 13/811,314

(22) PCT Filed: Apr. 14, 2011

(86) PCT No.: PCT/EP2011/055910
§ 371 (c)(1),
(2), (4) Date: Apr. 8, 2013

(87) PCT Pub. No.: WO2012/010334
PCT Pub. Date: Jan. 26, 2012

(65) Prior Publication Data
US 2013/0209012 A1   Aug. 15, 2013

(30) Foreign Application Priority Data
Jul. 21, 2010   (DE) .......................... 10 2010 031 606

(51) Int. Cl.
*B23B 29/034*   (2006.01)
*F16C 33/02*   (2006.01)
(Continued)

(52) U.S. Cl.
CPC ............. *F16C 33/02* (2013.01); *B23B 29/034* (2013.01); *B23B 29/03492* (2013.01);
(Continued)

(58) Field of Classification Search
CPC .......... B23B 29/034; B23B 29/03432; B23B 29/03489; B23B 29/03492; B23B 29/03496; Y10T 82/12; Y10T 82/125; Y10T 82/128; Y10T 408/39; Y10T 408/87; Y10T 408/8725

USPC ............... 82/1.2, 1.4, 1.5; 408/54, 189, 191; 384/294
See application file for complete search history.

(56) References Cited

U.S. PATENT DOCUMENTS 1,916,253 A * 7/1933 Buckley ............ B23B 29/03446
                                                    407/73
3,296,934 A * 1/1967 Kelly ..................... B23B 41/12
                                                    408/130
(Continued)

FOREIGN PATENT DOCUMENTS

DE          4418605 A1   11/1995
DE         19925193 A1   10/2000
(Continued)

*Primary Examiner* — Daniel Howell
*Assistant Examiner* — Nicole N Ramos
(74) *Attorney, Agent, or Firm* — Robert L. Stearns; Dickinson Wright, PLLC

(57) ABSTRACT

The invention relates to a tool for machining sliding surfaces of a bearing shell (30), comprising a rotary drive for driving a drilling spindle (20) that can be rotated about a rotational axis and at least one first cutting cartridge that is mounted on the drilling spindle (20) in order to cut the bearing shell (30) to a certain wall thickness by rotating the drilling spindle (20). The tool is characterized in that the first cutting cartridge can be adjusted by an adjustment means in a direction of adjustment that has a component in the radial direction of the drilling spindle, while the drilling spindle (20) is rotated by the rotary drive. The invention further relates to a bearing shell (30) comprising a deliberately structured sliding surface (31) and to a method for producing a bearing shell (30) comprising a deliberately structured sliding surface (31).

7 Claims, 1 Drawing Sheet

(51) Int. Cl.
    *B23B 41/12* (2006.01)
    *B23P 13/02* (2006.01)
    *F16C 33/14* (2006.01)
(52) U.S. Cl.
    CPC .............. *B23B 41/12* (2013.01); *B23P 13/02* (2013.01); *F16C 33/14* (2013.01); *B23B 2260/108* (2013.01); *Y10T 82/12* (2015.01); *Y10T 82/125* (2015.01); *Y10T 82/128* (2015.01); *Y10T 408/03* (2015.01); *Y10T 408/655* (2015.01)

(56) References Cited

U.S. PATENT DOCUMENTS

| | | | |
|---|---|---|---|
| 3,391,585 A | | 7/1968 | Griswold et al. |
| 3,530,745 A | | 9/1970 | Milewski |
| 3,823,626 A | * | 7/1974 | Bakewell ............. B23Q 27/006 408/54 |
| 4,072,083 A | * | 2/1978 | Cesal ................... B23C 5/06 408/180 |
| 4,175,894 A | * | 11/1979 | Skrentner ......... B23B 29/03417 408/1 R |
| 4,224,846 A | * | 9/1980 | Eysel ............... B23B 29/03457 408/147 |
| 4,278,372 A | * | 7/1981 | Heisner ............ B23B 29/03417 407/45 |
| 4,508,475 A | * | 4/1985 | Peuterbaugh ..... B23B 29/03446 408/153 |
| 4,840,095 A | * | 6/1989 | Nussbaumer ............ B23B 3/06 29/27 C |
| 4,941,782 A | * | 7/1990 | Cook ............... B23B 29/03457 408/147 |
| 5,086,676 A | * | 2/1992 | Gifford ............. B23B 29/0345 408/1 R |
| 5,159,862 A | * | 11/1992 | Byrnes ................... B23B 29/02 408/181 |
| 5,203,856 A | * | 4/1993 | Stephens ........... B23B 29/03457 408/159 |
| 5,427,480 A | | 6/1995 | Stephens |
| 6,010,284 A | * | 1/2000 | Ito ........................... B23B 41/12 408/108 |
| 6,120,187 A | * | 9/2000 | Ono ......................... F16C 9/04 384/273 |
| 6,139,191 A | * | 10/2000 | Andler .................... C23C 14/06 384/276 |
| 6,227,082 B1 | * | 5/2001 | Hormansdorfer .... B23Q 1/5456 82/1.11 |
| 6,343,899 B1 | * | 2/2002 | Straub ............... B23B 29/03482 408/150 |
| 6,536,997 B1 | * | 3/2003 | Kress ...................... B23B 29/02 408/1 R |
| 7,039,992 B2 | * | 5/2006 | Tokuma .................. B23B 3/162 29/27 C |
| 7,260,877 B2 | * | 8/2007 | Broadley ........... B23B 29/0345 29/27 R |
| 2006/0002643 A1 | * | 1/2006 | Aubele ............... F16C 33/1045 384/288 |
| 2006/0274982 A1 | * | 12/2006 | Welch ....................... F16C 9/00 384/294 |
| 2009/0038450 A1 | * | 2/2009 | Campbell ............. B23B 29/125 82/1.11 |
| 2010/0054874 A1 | * | 3/2010 | Azzopardi ............. B23B 29/02 407/45 |

FOREIGN PATENT DOCUMENTS

| | | |
|---|---|---|
| DE | 19919559 B4 | 11/2005 |
| EP | 1911986 B1 | 7/2009 |
| JP | H0435651 U | 3/1992 |
| JP | H11230160 A | 8/1999 |

\* cited by examiner

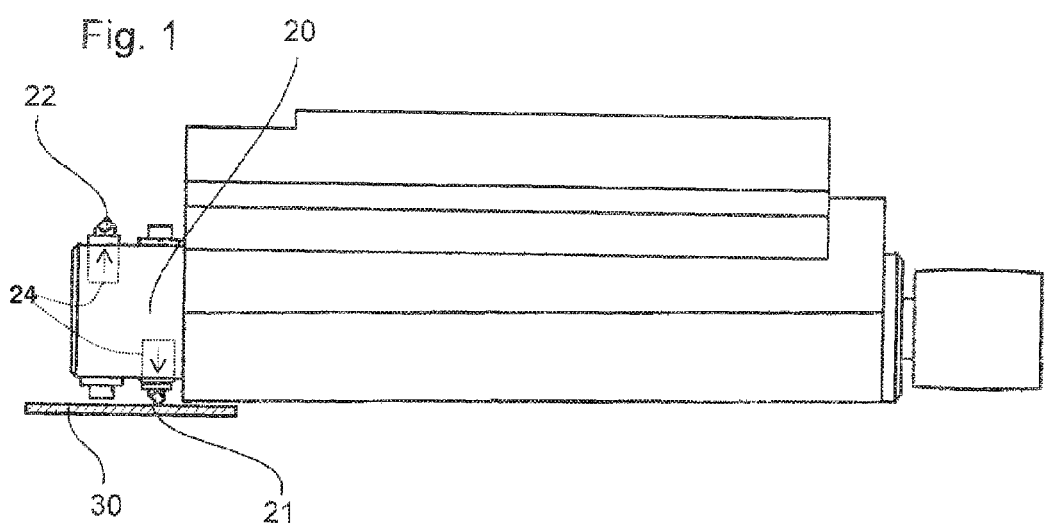
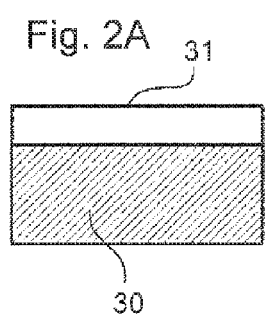
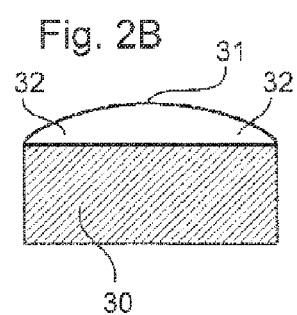
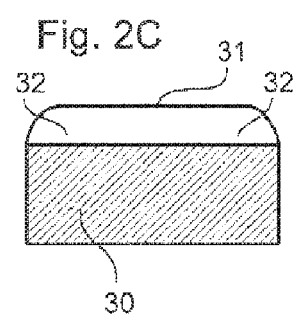
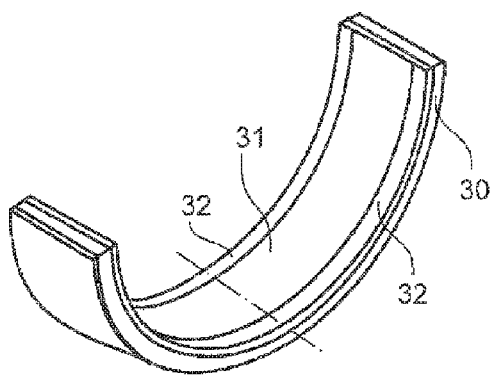

STRUCTURED SLIDING SURFACE OF A BEARING SHELL

BACKGROUND OF THE INVENTION

1. Technical Field

The present invention relates to a bearing shell having a structured sliding surface, to a tool for machining sliding surfaces of bearing shells, which comprises two cutting cartridges that are mounted on the spindle head of a drilling spindle, and to a method for machining a bearing shell using such a drilling spindle.

2. Related Art

The machining of sliding surfaces of bearing shells is nowadays implemented by means of a so-called drilling out of the bearing shells. A drilling spindle hereby rotates at a rotational speed X [rev/min] and moves at a feed rate Y [mm/rev] in the axial direction. Drilling out is implemented by means of a drilling spindle, inserted in the spindle head of which are two cutting cartridges lying opposite one another at 180°.

A drilling spindle of this kind is shown in FIG. 1. The drilling spindle 20 comprises a first cutting cartridge 21 for cutting the bearing shell 30 to a certain wall thickness and a second cutting cartridge 22 for forming so-called exposed regions (crush relief surfaces) that will be explained below. The cutting cartridges 21 and 22 are arranged axially offset on the spindle head. The diameter of the cutting circle can be adjusted when the drilling spindle 20 is idle. During the machining process, the two cutting cartridges are fixed with respect to their axial direction, i.e. in the radial direction of the drilling spindle 20.

FIG. 2A shows a cross-section (along the dashed and dotted line shown in FIG. 3) of a bearing shell 30. As is shown in FIG. 2A, the sliding surface 31 is flat along the axial direction of the bearing shell. Depending on the machining feed rate in conjunction with the rotational speed of the drilling spindle, a more or less fine but very uniform course of grooves is formed on the sliding surface (not shown in the figures) when machining the sliding surface. The individual grooves extend uniformly and, with the exception of the radius of curvature of the bearing shell, in a flat manner. This phenomenon occurs as a result of the process and is unavoidable when using a cutting tool of the type described above.

An exposed region is to be understood as a region at the ends of the bearing shell, in which the wall thickness of the bearing shell is continuously reduced as compared to the wall thickness of the rest of the bearing shell. In this manner, the wear of a shaft running in the bearing shell, which is due to imprecisions at the connection sites of the two bearing shells that form a bearing, can be reduced.

A further cause of wear on the bearing and the shaft mounted therein is a minimal bending or tilting when a load is applied to the shaft. If the bearing is a connecting rod eye or another bearing that is subject to high loads in internal combustion engines, these uneven loads of the shaft on the bearing ultimately have a disadvantageous effect on the running behaviour of the engine.

SUMMARY OF THE INVENTION

The object of the present invention is to provide a bearing shell having improved wear properties, a tool as well as a method for producing such a bearing shell.

The tool according to the invention comprises a preferably cylindrical drilling spindle, which is driven by a rotary drive and simultaneously implements a feed movement. The drilling spindle rotates about a rotational axis and comprises at least one first cutting cartridge that is mounted on or inserted in the drilling spindle at the outer circumference. During the machining of a bearing shell, a cutting region of the cutting cartridge comes into contact with the sliding layer of the bearing shell and cuts the bearing shell to a certain wall thickness upon rotation of the drilling spindle, as a result of which the actual sliding surface is also simultaneously produced. According to the invention, the first cutting cartridge can be adjusted in its axial direction by an adjusting means during operation of the tool. The direction of adjustment differs from the direction of the rotational axis, and thus the direction of adjustment has a non-zero component in the direction perpendicular to the rotational axis. This allows a profile to be realised in a targeted manner in the sliding region of the bearing shell when drilling out the bearing shell. If, as a result of the process, the bearing shell experiences a very uniform profiling as described above, this profiling is superimposed by the targeted profiling. This targeted structuring is thus to be distinguished from a possibly inevitably realised minimal groove profiling, and is also distinguishable owing to the uniformity of the profiling that occurs as a result of the process. Owing to the targeted profiling, the build-up of lubricating film between the sliding bearing shell and the shaft mounted therein is improved, the emergency running properties during operation are improved, and a reduction in the oil losses at the sliding bearing site during operation is achieved. These advantages are achieved in that minimal bending or tilting of the shaft during operation and under load is compensated or is at least reduced by a sliding surface geometry which is adapted to the operating conditions.

In order to effectively realise a structured profiling, the direction of adjustment is preferably substantially perpendicular to the rotational axis.

The drilling spindle preferably comprises at least one second cutting cartridge. For this purpose, the first cutting cartridge is preferably arranged offset behind the second cutting cartridge in the feed direction of the tool. The two cutting cartridges are preferably mounted opposite one another at 180° on the drilling spindle. By means of a suitable positioning of the second cutting cartridge and a tilting of the drilling tool in respect of the bearing shell axis during machining, exposed surfaces can be formed at the ends of the bearing shell. By means of the exposed regions, it is prevented that imprecisions at the connection sites of the two bearing shells lead to the inner edge of a partial surface at a connection site protruding inwardly. As a result hereof, the running properties of the shaft are improved and the wear on the bearing and the shaft is reduced. With just one tool and just one drilling-out step, two measures for optimising wear and improving running properties can be realised in this manner. A separate machining step for realising the targeted profiling is not necessary. A synergetic effect of the two measures lies therein.

The cutting cartridges can preferably be adjusted by an adjusting means in the direction of adjustment that differs from the direction of the rotational axis, whilst the drilling spindle is rotated by the rotary drive. It is, of course, also conceivable that only one of the two first cutting cartridges for forming a structured groove profile in a bearing shell is adjustable in the direction of adjustment.

The adjusting means preferably comprises or comprise (in the case of a plurality of adjustable cutting cartridges) a piezo element. The possibility of adjustment is thus created continuously or at a certain frequency by a piezo element which is preferably disposed in the drilling spindle head. The cutting cartridge is structurally arranged in the spindle head such that it is preferably braced against the piezo element. By means of a corresponding actuation of the piezo element, this element expands and thus alters the position of the cutting cartridge in the axial direction. Owing to the short reaction times and the precision with which the piezo element works, a possibility for adjusting the cutting cartridge, which is suitable for the machining process, is hereby created.

According to the invention, the tool enables the production of a bearing shell that is profiled in the axial direction, the sliding surface of which has a targeted convex profiling.

The targeted profiling is preferably located at the edge regions of the sliding surface in the axial direction of the bearing shell. The ends of the bearing shells at which two bearing shells are connected to form a bearing are to be distinguished from the edge regions in the axial direction. The extent to which the profiling in the axial direction extends into the bearing shell from the two edges can be adapted to the specific requirements and loads. A targeted profiling can, of course, also be provided in the exposed regions.

The sliding surface is preferably curved at the edge regions in the axial direction and flat therebetween, with the sliding surface being convexly curved at the edge regions; i.e. the sliding surface, or the sliding surface and the exposed region, curves away from the central point (circle centre) of the bearing shell. Alternatively, the sliding surface of the bearing shell, and optionally the exposed region, is curved in the axial direction over the entire area, with the radius of curvature being greatest at the edge regions in the axial direction of the bearing shell and the curvature of the sliding surface being convex. In both cases, a minimal bending or tilting of a shaft that is running under load in the bearing shell is at least partially compensated in the case of a simple production of the curved running surface.

BRIEF DESCRIPTION OF THE DRAWINGS

FIG. 1 shows a conventional drilling spindle having two cutting tools, one for machining exposed regions and one for machining the sliding region of a bearing shell.

FIG. 2A shows a conventional, flat sliding surface profile.

FIG. 2B shows a curved sliding surface profile.

FIG. 2C shows a sliding surface profile that is curved at the edge regions of the bearing shell.

FIG. 3 shows a perspective view of a bearing shell having a sliding surface profile that is curved at the edge regions.

DETAILED DESCRIPTION OF THE INVENTION

Described above with reference to FIG. 1 was a conventional tool for machining sliding surfaces of bearing shells. In an embodiment according to the invention, the cutting cartridge 21 is braced against a piezo element 24. By means of a corresponding actuation of the piezo element or piezo elements 24 (in the case of a plurality of cutting cartridges), this element expands and thus alters the axial position of the cutting cartridge, namely mainly in the radial direction relative to the drilling spindle 20.

When using the adjustable cutting cartridge, profiles of the bearing shell such as are shown in FIGS. 2B, 2C and 3 can, for example, be produced. Owing to the curvature in particular at the edge regions 32, also described as the exposed regions located at axial ends of the bearing shell, the effects on wear and running properties due to a bending or tilting of a shaft running under load in the bearing shell are lessened. Reference is made to the fact that the curvature in FIGS. 2B, 2C and 3 has been greatly exaggerated for the purpose of demonstration.

The invention claimed is:

1. A drilling tool for machining a bearing shell of a two-piece bearing wherein the bearing shell extends around a bearing shell axis in a circumferential direction between opposite ends, the tool comprising a rotary drive for driving a drilling spindle that is configured to be rotated about a drilling spindle rotational axis and at least one first cutting cartridge that is mounted on said drilling spindle in order to cut the bearing shell to a certain wall thickness by rotating the drilling spindle, wherein
   the first cutting cartridge is configured to be adjusted in a radial direction relative to the drilling spindle rotational axis, whilst the drilling spindle is rotated by the rotary drive, to profile the sliding surface at least adjacent opposite axial edges of the bearing shell, wherein
   the drilling spindle comprises at least one second cutting cartridge and the drilling tool being tiltable relative to the bearing shell axis whilst the drilling spindle is rotated by the rotary drive to cut exposed surfaces in the bearing shell adjacent the opposite ends with the at least one second cutting cartridge, wherein the bearing shell has a reduced wall thickness in areas of the exposed surfaces as compared to the rest of the bearing shell, and wherein the second cutting cartridge lies in front of the first cutting cartridge in a feed direction parallel to the drilling spindle rotational axis.

2. The tool according to claim 1, wherein the two cutting cartridges are mounted opposite one another at 180° on the drilling spindle.

3. The tool according to claim 1, comprising a piezo element for adjusting the first cutting cartridge in the radial direction.

4. A method for machining a bearing shell of a two-piece bearing wherein the bearing shell extends around a bearing shell axis in a circumferential direction between opposite ends using a drilling tool comprising a rotary drive for driving a drilling spindle that is configured to be rotated about a drilling spindle rotational axis and at least one first cutting cartridge that is mounted on said drilling spindle in order to cut the bearing shell to a certain wall thickness by rotating the drilling spindle, the method comprising the steps of:
   rotating the drilling spindle about the drilling spindle rotational axis,
   moving the first cutting cartridge in a radial direction relative to the drilling spindle rotational axis whilst the drilling spindle is rotated by the rotary drive to cut profiles into the sliding surface adjacent opposite axial edges of the bearing shell, and
   tilting the drilling tool relative to the bearing shell axis such that the drilling spindle cuts exposed surfaces into the bearing shell adjacent the opposite ends of the bearing shell with at least one second cutting cartridge that lies in front of the first cutting cartridge in a feed direction parallel to the drilling spindle rotational axis and wherein the bearing shell has a reduced wall thickness in areas of the exposed surfaces as compared to the remainder of the bearing shell.

5. The method according to claim 4, wherein the movement of the first cutting cartridge occurs periodically.

6. The tool according to claim 1, including a piezo element or elements for adjusting both the first and second cartridges in their respective directions of adjustment.

7. The method according to claim 4, wherein the profiles that are cut into the sliding surface adjacent the opposite axial edges of the bearing shell are convex in the axial direction of the bearing shell.

\* \* \* \* \*